Dec. 21, 1965   R. J. THOMAS   3,224,845
CONTROLLED WETTING OF NON-AQUEOUS FLUIDS
Filed July 19, 1962
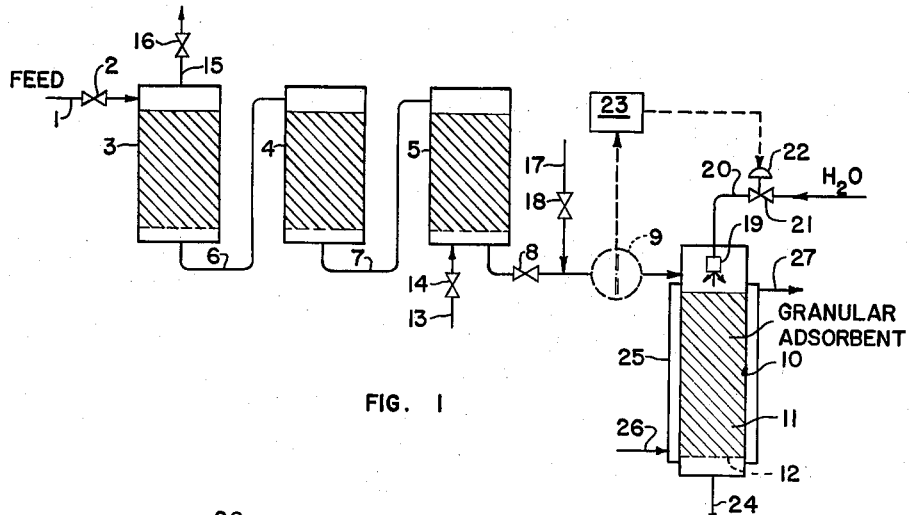
FIG. 1
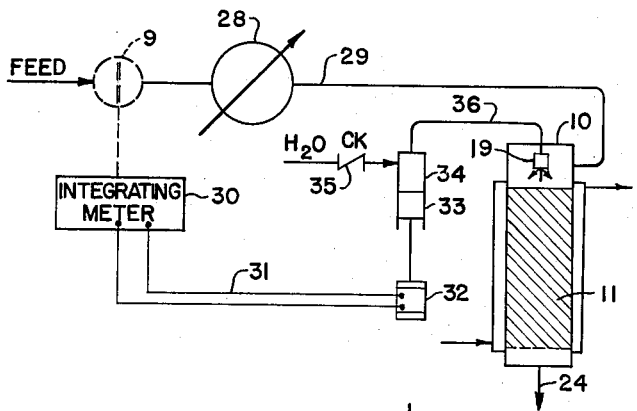
FIG. 2
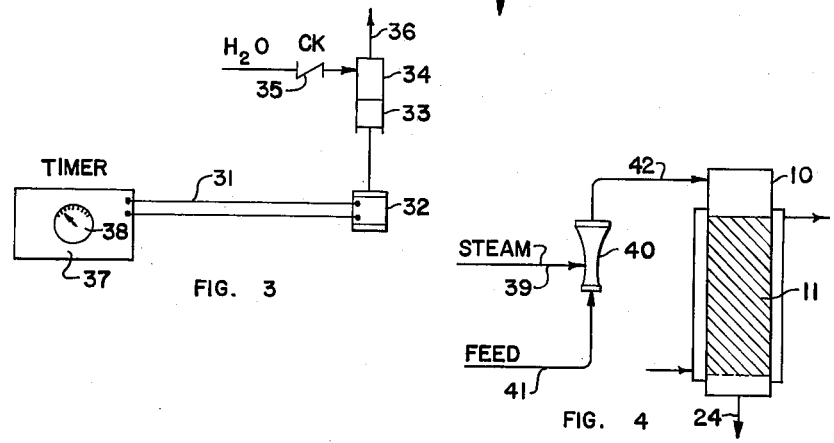
FIG. 3
FIG. 4
INVENTOR:
ROBERT JAMES THOMAS
BY Oswald H. Milmore
HIS ATTORNEY

United States Patent Office 3,224,845
Patented Dec. 21, 1965

3,224,845
CONTROLLED WETTING OF NON-AQUEOUS FLUIDS
Robert James Thomas, Lafayette, Calif., assignor to Shell Oil Company, New York, N.Y., a corporation of Delaware
Filed July 19, 1962, Ser. No. 210,994
4 Claims. (Cl. 23—312)

The invention relates to the production of liquid or gaseous compositions containing water dissolved in a selected concentration in a non-aqueous fluid. It is especially useful when the water concentration must be carefully controlled and to producing compositions wherein said concentration is small, viz., less than 0.1%.

Solutions which have minor amounts of water dissolved in a non-aqueous fluid are useful in a variety of processes. Among them are hydrocarbon feed streams to polymerizing operations, wherein small amounts of water are required to be present. As a specific example, in the polymerization of 1,3-butadiene to produce a polymer containing a high proportion of the cis-1,4 polymer structure, the 1,3-butadiene, dissolved in other $C_4$ hydrocarbons, sometimes together with small amounts of benzene, is polymerized catalytically. As is disclosed in the U.S. patent of Carlson, Dong, Higgins and Wilcoxen, No. 3,066,127, trace quantities of water within the broad range of 1 to 50 p.p.m., usually between 2 and 30 p.p.m., exert important controlling effects on the polymerization reaction and on the properties of the resulting polymer; moreover, it is important to maintain the water concentration at a selected level with but minor fluctuations to produce a polymer of uniform properties. In some instances changes in the water concentration as little as one or two p.p.m. from the selected concentration are deleterious and variations in the water concentration as small as one tenth to one-half p.p.m. cause detectable variations in the properties of the resulting polymer. In other applications solutions containing higher concentrations of water, up to 200 to 300 p.p.m., are desired, as when the liquid hydrocarbon solution is to be added in minor amounts to an essentially anhydrous hydrocarbon stream to produce a blended stream containing a lower but predetermined concentration of water, or when the hydrocarbon solution is used to test the drying characteristics of drying beds, such as desiccants, adsorption beds or synthetic zeolites capable of selectively absorbing water or water and other substances, herein referred to as molecular sieves.

An example of non-hydrocarbon fluid is nitrogen or helium gas which must at times contain a small, regulated amount of water, as when it is to flow through a non-lubricated compressor.

It has been difficult to control the water concentration within narrow limits of variations by using known techniques, especially when low water concentrations are involved. Batch makeup, wherein measured amounts of water in the liquid or vapor state are injected into a vessel containing a known quantity of the non-aqueous fluid as a liquid and stirring, leads to variations in water concentration as the vessel becomes depleted, due to changes in the vapor space and consequent differential vaporization. When the fluid is a gas there are problems of changing pressures, and measurement of the quantity of fluid is difficult. Continuous makeup, wherein liquid water is injected into a stream of liquid or gaseous non-aqueous fluid, leads to non-uniform distribution of the water in the fluid, due to coalescence of water and adherence to walls of the flow channels; also, inaccuracies arise from the difficulty of metering precisely the vary small quantities of water involved. Similar difficulties arise when water is injected in the form of steam for continuous makeup, e.g., the condensation of the steam leads to the formation of drops which are not uniformly distributed. It may be noted that when the fluid is at an elevated pressure, the steam must necessarily be at a high temperature and will condense upon coming into contact with a colder fluid.

Moreover, it is necessary to know the exact moisture content of the feed stream of non-aqueous fluid in any technique which involves the addition of water, be it zero or some other value less than the desired water concentration. It is difficult to analyze streams to determine the moisture content with an accuracy of a few or even a fractional part of one part per million.

It is the object of the invention to provide a method and apparatus for preparing compositions containing a selected concentration of dissolved water in a non-aqueous fluid wherein the selected concentration is more conveniently maintained than in prior techniques.

A further object is to provide a method and apparatus as indicated which are lower in cost than prior techniques.

Still further objects are to make the hydrating operation less critically dependent upon minor fluctuations in the moisture content of the feed stream; and to reduce the range of fluctuation of the water concentration in the product.

In summary, according to the invention a liquid or gaseous non-aqueous fluid stream which is free from water in concentration as high as a desired final concentration (e.g., is essentially anhydrous or contains a known, substantially constant amount of water) is flowed through a wetting bed containing a granular adsorbent and a controlled amount of water—either liquid or steam—is introduced into the bed either continuously or intermittently, to saturate the bed to the point at which it gives up water instead of taking up water from the fluid.

The wetting bed is preferably elongated in the flow direction, having a length more than three times its diameter. This reduces the likelihood of channelling by the fluid and leads to a more uniform effluent.

In a preferred embodiment the invention further includes the dehydration of a non-aqueous fluid feed stream to reduce the water content to a level below the permissible fluctuation in the final stream and the passage of the dehydrated stream through the wetting bed. For example, if the water content in the final stream is to be maintained at a selected concentration plus or minus 1 p.p.m., the feed stream is dehydrated to reduce the moisture content to below 1 p.p.m.

The invention is founded on the principle that granular adsorbents, also known as drying agents or desiccants, act both as water adsorbents and water donors, and that in a system which contains the adsorbent, adsorbed water and a non-aqueous fluid, there exists an equilibrium between the amount of water on the adsorbent and the moisture concentration in the fluid. The effluent fluid, will, therefore, approach equilibrium with the wet granules at the part of the bed from which it is discharged. It was found that when the fluid stream has flowed through the wetting bed for a sufficient time to attain a steady-state condition the effluent contains moisture in concentration which varies but little from that determined on the basis of the average overall ratio of water and the non-aqueous fluid admitted.

The bed is effective to smooth out fluctuations in water concentration in the effluent with respect to time; because of the very small amounts of moisture lost to the fluid, within a period of several minutes or longer changes in the amount of water are so small that the equilibrium point is not altered significantly. Further, by providing an elongated bed which is not too wide the moisture within the bed is well distributed, so that different parts of the fluid all contain moisture in about the same concentration.

It is generally undesirable to use a wetting bed which is larger than necessary to smooth out fluctuations in water content due to excessive "inertia" effect. This effect may be explained as follows: An excessively large bed is slow to respond to changes in the selected moisture content of the effluent and may be subject to undesirable temperature effects. For example, if it is desired to reduce the moisture content in the effluent, a very long time would elapse before the moisture content of the bed fell sufficiently to attain the newly selected moisture content in the effluent. Also, a change in temperature brings about a change in the equilibrium conditions which, in turn, alters the water content of the bed in equilibrium with an effluent of any given moisture content; if the bed is too large it will be slow to respond to adjustments made in the moisture contents of the bed, and the temperature effect will continue in the effluent.

Of course, the bed should be large enough to smooth out variations in the total amount of water admitted, to within the desired tolerance. Thus, there may be variations in the rate of water introduction due to changes in the moisture content of the feed stream, and/or due to introduction of water at intervals instead of continuously.

The invention will be further described with reference to the accompanying drawing forming a part of this specification and showing two preferred embodiments by way of illustration, wherein:

FIGURE 1 is a diagram showing the apparatus, treating units being shown in elevation;

FIGURE 2 is a diagram of a part of FIGURE 1 showing a modified arrangement for controlling the admission of the fluid and water to the wetting bed;

FIGURE 3 is a fragmentary diagram showing another means for controlling the admission of water; and FIGURE 4 is a diagram of a part of FIGURE 1 showing a modification in the mode of admitting water.

Referring to FIGURE 1, the non-aqueous feed stream, such as a hydrocarbon in the liquid or gaseous phase, containing an unknown amount of moisture, is admitted at 1 via a valve 2 into a dehydrating zone which may comprise two adsorbent drying beds 3 and 4 and a molecular sieve 5, connected in series by pipes 6 and 7. The dehydrated stream is discharged through a valve 8 and a flow-measuring device 9 of any suitable type into a column 10 which contains a bed of granular adsorbent 11 forming the wetting bed. The material may be supported on a perforated tray 12. Although the meter 9 is represented diagrammatically as an orifice meter it may be a displacement meter.

The dehydrating zone is provided with suitable means for regeneration and may further include means (not shown) for detecting moisture in the effluent to provide a signal that regeneration is necessary. The regeneration elements may include an inlet pipe 13 having a valve 14 and an exit pipe 15 having a valve 16, the valves 14 and 16 being normally closed. For continuous operation several such dehydration zones may be provided in parallel; thus, a second zone (not shown) may discharge its dehydrated stream via a pipe 17 and valve 18 while valves 2 and 8 are closed and heated regeneration fluid is admitted via valve 14 and discharged via valve 16. It is evident that other modes of regeneration may be used, e.g., flow of the regeneration in the direction opposite to that stated and/or flooding the beds with water before regeneration.

The wetting bed 11 contains or consists of granules of adsorbent, preferably a member of the class consisting of activated alumina and silica gel; however, other adsorbents for water, such as activated clay, bauxite or molecular sieves may be substituted. The adsorbent will be selected having regard to the nature of the fluid. Thus, if the fluid consists of or contains hydrocarbons which can be polymerized, such as olefins, an agent which does not significantly promote such polymerization is selected.

For example, silica gel tends to promote polymerization of unsaturated hydrocarbons and activated alumina is preferred for such hydrocarbons. The granules may, for example, have particle diameters from 0.1 to 0.5 inch and provide 30 to 50% of void spaces.

A distributor, such as a spray head or atomizer 19, is mounted within the vessel 10 above the wetting bed and is supplied with water as a liquid or as steam through a pipe 20 controlled by a valve 21. The valve may be operated by a valve operator 22 in response to a control signal from a controller 23 which acts in response to the meter 9. It may be noted that the parts 9, 22 and 23 are optional; thus, when the flow rate is constant and known the valve 21 may be set to a selected setting for the continuous admission of water. The product stream is discharged from the vessel 10 through an outlet pipe 24.

Before operation, the bed 11 is moistened as necessary to wet the granules approximately to the steady state condition. Thereafter, the moisture of the feed stream is reduced to about 1–5 p.p.m. in the beds 3 and 4 and is further lowered in the molecular sieve 5, preferably to a level below 1 p.p.m., e.g., 0.1 to 0.5 p.p.m. The granules in the upper part of the bed 11 have adsorbed moisture in excess of that in equilibrium with the dehydrated stream, and moisture is, therefore, dissolved in the fluid and carried down. In the lower part of the bed either more moisture is dissolved in the fluid or some is adsorbed on the granules, so as to approach equilibrium. The effluent stream at 24 is substantially in equilibrium with the granules in the lower part of the bed. When a steady state condition is reached the effluent stream contains dissolved water in a concentration which corresponds to the ratio of the streams through the meter 9 and pipe 20. This was found to remain steady, and fluctuations could be maintained within less than one part per million.

The extent of fluctuation of the water concentration of course depends, apart from the constancy of the rates at which the fluid stream and water are admitted, upon the size of the wetting bed in relation to the flow, the mode used in admitting water, and temperature. The latter two are opposed to one another: While a larger bed is usually conducive to smaller fluctuations, it results in poorer controllability should a change in temperature alter equilibrium conditions. This is because in working with extremely low rates of water offtake a large bed will produce an effluent having an incorrect water content for an extended time until a new steady state condition is reached. It was found that, in general, the volume of the bed, in cubic inches, is advantageously between about 0.002 and 0.2 times the product of the hourly throughput of the fluid stream, in pounds, and the concentration of the water in the effluent, in parts per million.

The vessel 10 may, if desired, be protected against temperature changes by insulation material and/or by a jacket 25 through which a thermal fluid is circulated via pipes 26 and 27. This may have any convenient temperature, such as 25° C. It should be noted that temperature is also significantly influenced by the feed stream which is advantageously supplied at a constant temperature. When these precautions are taken, somewhat larger beds can be used.

Molecular sieves are less sensitive to temperature changes.

As regards the mode of admitting water, continuous flow is not essential and often leads to inaccuracies in metering when very small amounts, such as one gram per hour, are admitted. In such cases it is preferred to admit the water intermittently in small doses, e.g., once every ten minutes to once every hour or even longer.

FIGURE 2 shows a modified arrangement of the feed streams for implementing the above-mentioned features, it being understood that the control of the feed temperature and the intermittent admission of water, can each be applied independently. In this embodiment the dehydrated fluid flows from the meter 9 through a heat exchanger 28 wherein it is brought to a constant temperature before flow through the pipe 29 to the vessel 10. The meter 9 is an element of an integrating meter 30 which counts the quantity of fluid flowing to the vessel 10 and emits an electrical signal via circuit 31 each time that a predetermined quantity of fluid has passed. The circuit is connected to a motor, such as an electromagnet 32, the armature of which is coupled to the piston 33 of a dosing pump 34, i.e., a pump that delivers a unit dose on each stroke. Water is admitted through a check valve 35 to the pump and delivered by a pipe 36 to the atomizer 19. The dosing pump is preferably of the adjustable type whereby the size of each dose can be varied. The size of the dose is selected to permit accurate delivery of successive amounts of water at intervals of several minutes up to one hour or more.

When the flow rate of the fluid stream is steady it is not necessary to employ the meter 9. In this case the addition of water can be controlled by a timer as shown in FIGURE 3. The timer 37 has an adjustable interval, controlled by an indicator 38 and transmits an electrical impulse to the circuit 31 at the end of each time interval. Other parts of the system are as previously described, save that the meter 9 is omitted.

The moisture can also be introduced together with the non-aqueous stream, as shown in FIGURE 4. Although it is especially suitable when both the fluid and the water are in the vapor phase, it is not limited to these conditions. In this embodiment the steam is admitted through a pipe 9 continuously or intermittently, controlled by any of the means previously described, to an ejector 40. The dehydrated, non-aqueous fluid is supplied to the ejector as the carrier via a pipe 41 and the resulting mixture of fluid and moisture are introduced into the vessel 10 via a pipe 42.

EXAMPLE

In the polymerization of 1,3-butadiene at 60° C., contained in a solution consisting essentially of 15% butadiene, 65% of other $C_4$ olefins and 20% benzene, using a cobalt-aluminum alkyl catalyst, the Mooney viscosity of the polymer is critically affected by the amount of water in the feed stream to the polymerization reactor. At a water content in the feed stream of 20–25 p.p.m., a change of 1 p.p.m. produces a change of about 20 Mooney units. The Mooney viscosity is described in the A.S.T.M. test D 1646–61.

A series of batch polymerization reactions was carried out. In preparing the reactant the method described in connection with FIGURE 1 was used for dehydrating the hydrocarbon stream to bring its water content to below about 0.3 p.p.m. The dehydrated hydrocarbon was flowed in the liquid phase and at ambient temperature at the rate of 300 lbs. per hour through a wetting bed 18 inches long and 2 inches in diameter contained in an unjacketed vessel. 3 grams of water per hour were dripped into the bed to produce an effluent with an average water content of about 22 p.p.m., uniformly dissolved.

The analysis of polymers produced in 9 runs at 60° C. showed the average Mooney viscosity to be 59 units with a standard deviation of 12 units.

By way of comparison, 26 polymerizations were performed under the same conditions save that the water was supplied by adding a metered quantity of a water-in-benzene solution to the other hydrocarbons to produce a mixture having the same overall composition. The water-in-benzene solution was obtained by direct addition of liquid water to benzene, and agitating for 24 hours to produce a solution. The Mooney viscosity was 51 units with a standard deviation of 15.

The data show that the invention provides a satisfactory and simple method of wetting. It may be noted that the standard deviation of 12 includes the effects of deviations in monomer and catalyst concentrations.

I claim as my invention:

1. Method of continuously preparing a solution containing a selected concentration of water dissolved in a non-aqueous fluid which comprises the steps of:
    (a) dehydrating a feed stream of said fluid containing dissolved water within a dehydrating zone and therein reducing the water concentration to a substantially constant level below said concentration, and measuring the flow rate of said fluid,
    (b) flowing the dehydrated fluid stream through a wetting bed during said flow of the dehydrated fluid therethrough and at a point for flow through the bed concurrently with said stream of granular adsorbent,
    (c) introducing into said wetting bed a controlled amount of water responsively to said flow measurement, and
    (d) continuously discharging from said bed an effluent solution stream consisting of said fluid and water dissolved therein in the said concentration.

2. Method as defined in claim 1 wherein:
    (a) said fluid is a hydrocarbon,
    (b) the said selected concentration is within the range of 2 to 300 parts per million,
    (c) the dissolved water is, in the dehydration step, reduced to below 1 part per million, and
    (d) maintaining a selective temperature within the bed.

3. Method as defined in claim 1 wherein the water is admitted to said wetting bed in the liquid phase.

4. Method as defined in claim 1 wherein the water is admitted to the wetting bed as steam.

References Cited by the Examiner
UNITED STATES PATENTS

| | | | |
|---|---|---|---|
| 742,253 | 10/1903 | Starr | 165—39 XR |
| 1,682,588 | 8/1928 | Wietzel | 252—194 |
| 1,919,781 | 7/1933 | Forrest | 252—194 |
| 2,223,551 | 12/1940 | Carson | 165—39 |
| 2,283,989 | 5/1942 | Henry | 55—74 XR |
| 2,305,323 | 12/1942 | Savelli | 252—194 XR |
| 2,356,890 | 8/1944 | Schulze | 252—194 XR |
| 2,440,784 | 5/1948 | Perdew | 252—194 XR |
| 2,995,208 | 8/1961 | Maurer | 55—74 XR |

NORMAN YUDKOFF, *Primary Examiner.*